United States Patent
Krasner et al.

(10) Patent No.: US 10,089,706 B1
(45) Date of Patent: Oct. 2, 2018

(54) GPU VIRTUAL DEVICE DRIVER FOR OFFLOAD PROCESSING IN A STORAGE ARRAY

(71) Applicant: EMC Corporation, Hopkinton, MA (US)

(72) Inventors: Jonathan Krasner, Coventry, RI (US); Steven R. Chalmer, Redwood City, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 198 days.

(21) Appl. No.: 14/862,655

(22) Filed: Sep. 23, 2015

(51) Int. Cl.
  *G06T 1/20* (2006.01)
  *G06T 1/60* (2006.01)

(52) U.S. Cl.
  CPC . *G06T 1/20* (2013.01); *G06T 1/60* (2013.01)

(58) Field of Classification Search
  None
  See application file for complete search history.

(56) References Cited

U.S. PATENT DOCUMENTS

| | | | | |
|---|---|---|---|---|
| 2011/0102443 | A1* | 5/2011 | Dror | G06T 1/20 345/522 |
| 2013/0187932 | A1* | 7/2013 | Malakapalli | G06T 1/20 345/501 |
| 2016/0266833 | A1* | 9/2016 | Makineedi | G06F 12/1441 |

OTHER PUBLICATIONS

"How Computers Work" by Gerald A. Friedman, Douglas D. Lemon, and Tony T. Warnock, Los Alamos Science, No. 22, copyright 1994. (Year: 1994).*

* cited by examiner

*Primary Examiner* — James A Thompson
(74) *Attorney, Agent, or Firm* — Anderson Gorecki LLP (57) ABSTRACT

An interface mitigates the need for inter-application locks in a storage system with a HPP. The interface includes a virtual device driver that can be accessed by both emulation threads and guest OS Container threads and separate memory pages that are pinned for use as buffer spaces. The pinned buffer memory pages are shared by CPU cores and by individual virtual HPP client drivers. The interface enables virtualization of GPUs and HPPs.

12 Claims, 5 Drawing Sheets

GPU VIRTUAL DEVICE DRIVER FOR OFFLOAD PROCESSING IN A STORAGE ARRAY

BACKGROUND

Aspects of this disclosure are generally related to data storage systems which can be used to maintain relatively large data sets and support a relatively large number of concurrent users. The basic building blocks of a data storage system may include computing and storage nodes such as storage engines, storage arrays or storage servers. The nodes provide access to data storage devices such as disk drives and flash drives. A plurality of computing and storage nodes can be interconnected in order to function together as a cluster. A plurality of clusters can be interconnected by communication links to enable the clusters to function as a single distributed storage system.

SUMMARY

All examples, aspects and features mentioned in this document can be combined in any technically possible way.

In accordance with an aspect, an apparatus comprises: at least one storage and computing node comprising: at least one heterogeneous parallel processor comprising a central processing unit and a graphics processing unit; a plurality of data storage devices; a first guest operating system; a second guest operating system; and first and second virtual graphics processing units based on the graphics processing unit, the first virtual graphics processing unit allocated to the first guest operating system and the second virtual graphics processing unit allocated to the second guest operating system. In some implementations the apparatus comprises first and second virtual heterogeneous parallel processors based on the heterogeneous parallel processors, the first virtual graphics processing unit being part of the first virtual heterogeneous parallel processor and the second virtual graphics processing unit being part of the second virtual heterogeneous parallel processor. In some implementations the apparatus comprises a third virtual graphics processing unit based on the graphics processing unit, the third virtual graphics processing unit allocated to a node thread. In some implementations the apparatus comprises first and second sets of pinned memory pages, the first set of pinned memory pages allocated to the first guest operating system and the second set of pinned memory pages allocated to the second guest operating system. In some implementations the apparatus comprises first and second client drivers, the first client driver used by the first guest operating system to access the first virtual graphics processing unit and the second client driver used by the second guest operating system to access the second virtual graphics processing unit. In some implementations the apparatus comprises a virtual device driver via which the first client driver accesses the first virtual graphics processing unit and the second client driver accesses the second virtual graphics processing unit. In some implementations the virtual device driver comprises a software thread which presents a set of virtual communication protocol registers. In some implementations the virtual communication protocol registers comprise virtual peripheral component interconnect registers. In some implementations the virtual device driver provides communication protocol signaling between the client drivers, node threads and the virtual communication protocol registers. In some implementations the first virtual graphics processing unit comprises specific cores or virtual cores of the graphics processing unit.

In accordance with an aspect a method comprises: in at least one storage and computing node comprising at least one heterogeneous parallel processor comprising a central processing unit and a graphics processing unit, a plurality of data storage devices, a first guest operating system, and a second guest operating system: instantiating first and second virtual graphics processing units based on the graphics processing unit; allocating the first virtual graphics processing unit to the first guest operating system; and allocating the second virtual graphics processing unit to the second guest operating system. In some implementations the method comprises instantiating first and second virtual heterogeneous parallel processors based on the heterogeneous parallel processors, the first virtual graphics processing unit being part of the first virtual heterogeneous parallel processor and the second virtual graphics processing unit being part of the second virtual heterogeneous parallel processor. In some implementations the method comprises instantiating a third virtual graphics processing unit based on the graphics processing unit, and allocating the third virtual graphics processing unit to a node thread. In some implementations the method comprises creating first and second sets of pinned memory pages, allocating the first set of pinned memory pages to the first guest operating system and allocating the second set of pinned memory pages to the second guest operating system. In some implementations the method comprises instantiating first and second client drivers, the first client driver used by the first guest operating system to access the first virtual graphics processing unit and the second client driver used by the second guest operating system to access the second virtual graphics processing unit. In some implementations the method comprises the first client driver accessing the first virtual graphics processing unit via a virtual device driver and the second client driver accessing the second virtual graphics processing unit via the virtual device driver. In some implementations the method comprises the virtual device driver presenting a set of virtual communication protocol registers. In some implementations the virtual communication protocol registers comprise virtual peripheral component interconnect registers. In some implementations the method comprises the virtual device driver providing communication protocol signaling between the client drivers, node threads and the virtual communication protocol registers. In some implementations the method comprises allocating specific cores or virtual cores of the graphics processing unit to the first virtual graphics processing unit.

DETAILED DESCRIPTION

Some aspects, features and implementations may comprise computer components and computer-implemented steps or processes that will be apparent to those skilled in the art. It should be understood by one of ordinary skill in the art that the computer-implemented steps or processes may be stored as computer-executable instructions on a non-transitory computer-readable medium. Furthermore, it should be understood by one of ordinary skill in the art that the computer-executable instructions may be executed on a variety of physical processor devices. For ease of exposition, not every step, process or element is described herein as part of a computer system, but those of ordinary skill in the art will recognize steps, processes and elements that may have a corresponding computer system or software component. Such computer system and software components are therefore enabled by describing their corresponding steps, processes or elements, and are within the scope of the disclosure. When corresponding physical and non-physical elements are described herein, modifiers including but not limited to "logical," "virtual" and "emulated" are used to refer to non-physical elements and the absence of such modifiers is used to refer to corresponding physical elements. For example, a "logical device" is non-physical and a "device" is physical. It should also be understood that non-physical elements are not merely abstract concepts but rather are implemented with physical elements. For example, a logical storage device is backed by one or more physical storage devices where the logical storage device may represent a layer of abstraction between the logical device and the physical storage devices.

Figure 1:
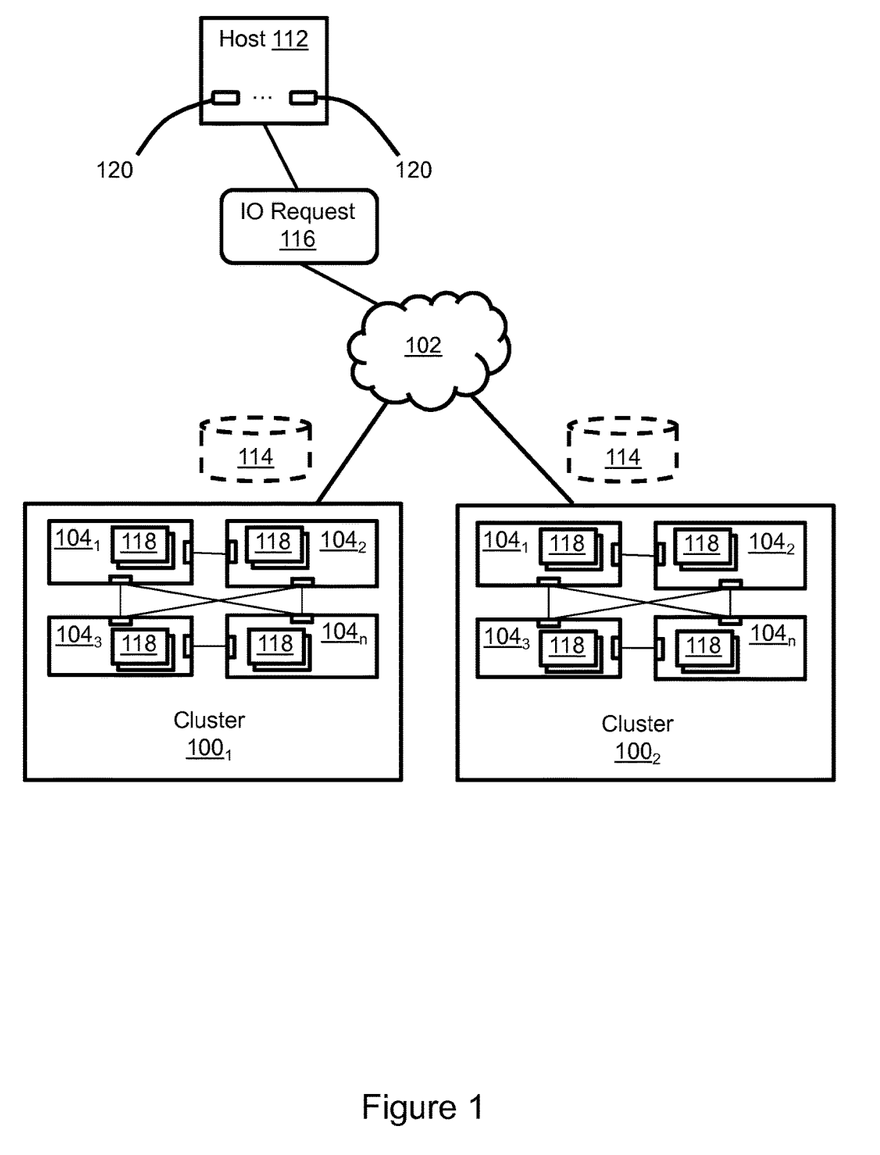
FIG. 1 illustrates a data storage system.

FIG. 1 illustrates a distributed data storage system that maintains data and supports IOs associated with a large number of concurrent users. The data storage system includes storage clusters $100_1$, $100_2$ that are interconnected via a network 102. For context and without limitation the network 102 could be a WAN (wide area network) or MAN (metropolitan area network). Each storage cluster $100_1$, $100_2$ includes one or more computing and storage nodes $104_1$-$104_n$. Each node is connected to every other node via point-to-point links across an interconnecting fabric. Each node may include one or more printed circuit board blades in one or more racks or chassis, just for example and without limitation.

An external device such as a user terminal or server may use the data storage system by communicating with an external host device 112 via the network 102. Although only one external host 112 is shown for clarity, multiple external host devices may be associated with each cluster, and each host device may host any of a wide variety of applications. An exemplary external host device may be a type of server which hosts one or more instances of an application 120 such as a database, for example and without limitation, for which the corresponding data is maintained by the data storage system. A communication between the external device and the instance of the application running on the host device 112 may prompt a corresponding IO request 116 to be sent to one of the clusters in order to read or write data. Any of the nodes $104_1$-$104_n$ in the cluster can receive and process IO requests, e.g., by writing data to physical storage devices or reading data from physical storage devices and sending the data to the host. The application and the external host device will typically be unaware of the actual location of data in the cluster. The IO request 116 references one or more locations in a logical storage device 114, of which there may be a plurality, e.g. and without limitation one per hosted application. The data stored on each logical storage device may be distributed across multiple physical storage devices and possibly mirrored by each cluster. Extents of data may be moved between physical storage devices in each cluster in response to tiering decisions and other factors. Each cluster maintains directories with mappings between the logical storage device 114 and the physical storage devices. Application threads running on a node OS (operating system) handle tasks including but not limited to IOs.

Hosted applications 120 may alternatively or additionally be operated on guest OSs which are hosted by the computing and storage nodes $104_1$-$104_n$. As will be explained in greater detail below, the guest OSs utilize the processor and memory resources of the nodes rather than the processor and memory resources of external host devices. The guest OSs may be different than, and independent of, the node OS. In the description below the guest OS and node OS are heterogeneous. Operating applications on guest OSs may avoid communication latency associated with the network. In order to facilitate contemporaneous access to processor resources by guest OS threads, node threads, or both, each node includes virtual HPPs (heterogeneous parallel processors) 118.

Figure 2:
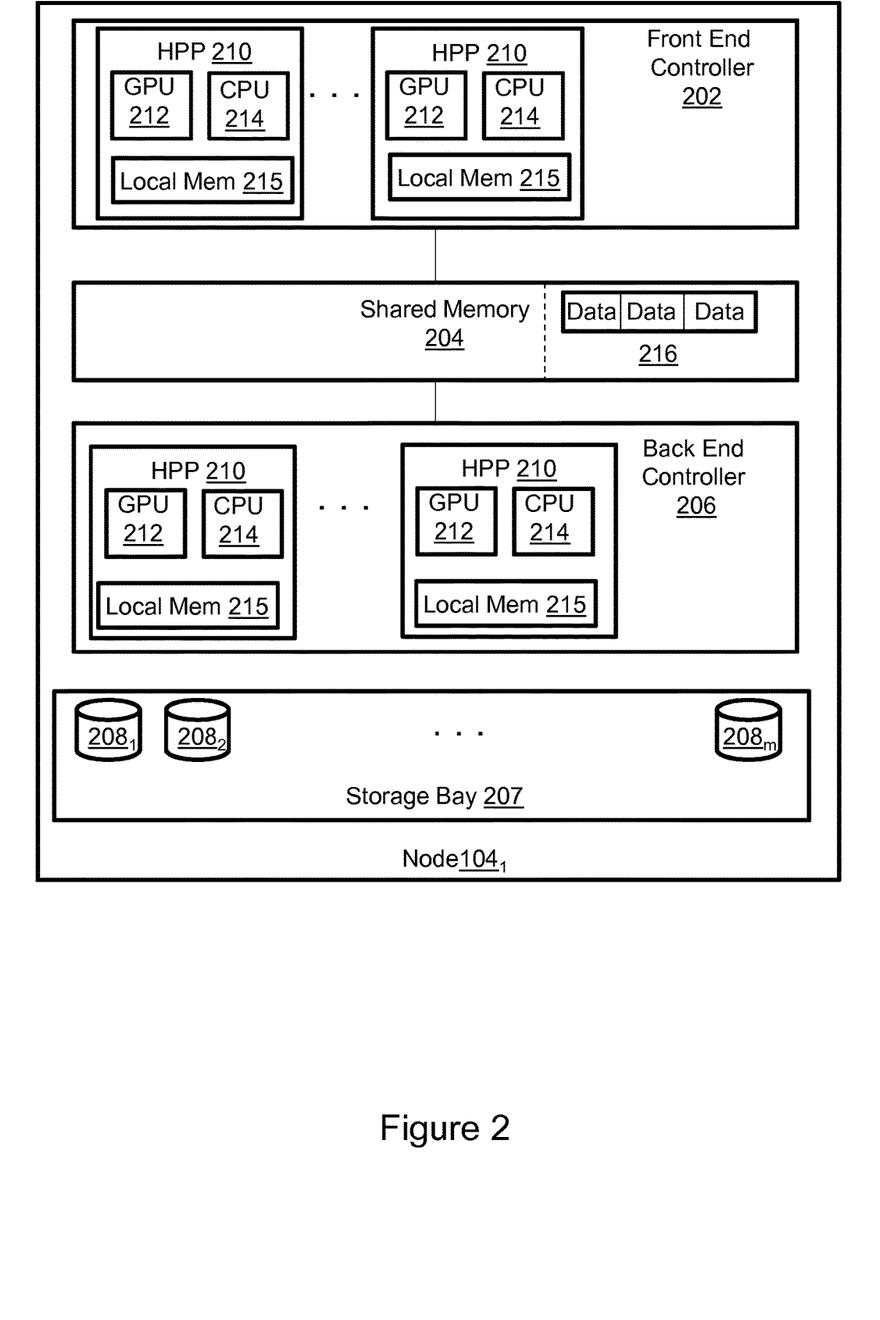
FIG. 2 illustrates a computing and storage node of the data storage system.

FIG. 2 illustrates an implementation of a computing and storage node $104_1$. Subsystems of the node include a front end controller 202, a shared memory 204, a back end controller 206, and a storage bay 207. The front end controller 202 and back end controller 206 each include one or more HPPs 210. Each HPP 210 includes at least two different types of processors 212, 214 and local memory 215. The different types of processors may have different instruction set architectures. In the illustrated example the different types of processors include a GPU (graphics processing unit) 212 and a CPU (central processing unit) 214. Each GPU and CPU may have multiple cores, but a GPU typically has more cores than a CPU, for example and without limitation by an order of magnitude or more. Further, a CPU is a serialized single-instruction-single-data device, whereas a GPU is a massively parallelized single-instruction-multiple-data device. Each GPU may have hundreds or thousands of cores handling the same instruction stream on multiple data. The GPU and CPU may be implemented on the same die, as different components on a single circuit board, as different components on different circuit boards, or any other of a wide variety of ways. The shared memory 204 may include volatile devices such as RAM (random access memory) chips. The local memory 215 may include DRAM (dynamic RAM). However, these implementation details are merely examples for context and should not be viewed as limiting.

Physical storage devices $208_1$-$208_m$ in the storage bay 206 may include one type of device or groups of different types of devices. Groups of different types of storage devices may be organized as hierarchical tiers. Each tier may be associated with a particular technology type of storage device. For example and without limitation, the storage devices may include one or more flash drives at tier 1, one or more FC (Fibre Channel) drives at tier 2, and one or more SATA (serial advanced technology attachment) drive at tier 3. Some or all of the storage devices could be non-local relative to the clusters. Examples of non-local storage with which the storage devices could be associated include but are not limited to cloud storage and storage nodes of other clusters in a federated storage system. Cloud storage arrays may include multiple storage arrays or servers and associated storage devices, and the storage arrays or servers and storage devices may be distributed across multiple locations. A federated storage system may include a virtualized storage node based on physical storage node building blocks which may be distributed across multiple locations.

Both the GPUs 212 and the CPUs 214 of all HPPs 210 have access to the shared memory 204. GPUs and CPUs also have access to the respective local memory 215 with which they are associated. RDMA (remote direct memory access) data transfer between both local and shared memories may be supported. Both the GPUs and CPUs of the back end controller also have access to the storage devices in the storage bay 207. Both the GPUs and CPUs of the front end controller can interface with other nodes and external devices. The front end controller 202 and back end controller 206 may each be implemented as a plurality of separate devices, for example and without limitation, separate cards in a chassis or separate modules in a rack. Moreover, individual subsystems or cards may include both a front end controller and a back end controller.

The HPPs 210 may be interconnected via communication links. The communication links may include one or more of a shared bus, point-to-point links, a mesh, hub-and-spoke, or any of a wide variety of architectures. A wide variety of technologies could be used to implement the links, including but not limited to PCI (peripheral component interconnect), PCIe (PCI Express), PCI-X (PCI eXtended), AGP (accelerated graphics port), Infiniband, and Ethernet. The interconnection of the HPPs may enable or facilitate the resources of multiple HPPs to be combined to perform computing tasks in a distributed manner and otherwise facilitate operation without burdening other busses and links. A PCI channel will be described as an implementation for the purposes of explanation.

Referring to FIGS. 1 and 2, the front end controller 202 presents the logical storage device 114 to instances of the hosted application 120. The logical storage device, which may be referred to as or by LUN (logical unit number), may be represented as a set of contiguous memory locations in a thinly provisioned virtual volume of storage. The storage capacity allocation associated with the logical device 114 can change over time, e.g., increasing in response to Writes by instances of the application. The hosted application and the host device will typically be unaware of the actual location of data on the physical storage devices in the storage bay. An IO request 116 sent by an instance of the application 120 to the cluster $100_1$ in order to Read or Write data will reference a location in logical storage device 114. The nodes maintain a mapping between the presented logical storage devices and the physical storage devices. The data that is virtually stored on each logical storage device may be distributed across multiple tiers and multiple storage devices $208_1$-$208_m$.

A cache slots section 216 of the shared memory 204 is used to temporarily store selected data. For example, data may be copied to the cache slots section of shared memory 204 from the storage devices $208_1$-$208_m$ in response to a hint or an IO Read request. This can enhance system performance because when data corresponding to an IO request is in the cache slots section of shared memory 204, i.e., a "cache hit," then that cached copy of the data can be used to quickly service the IO request. When the requested data is not in the cache slots section of shared memory, i.e. a "cache miss," then that data must be copied by the back end controller 206 from the storage devices into the shared memory 204 in order to service the IO request. Data associated with an IO Write request from a host device is initially written to the shared memory and subsequently flushed from the shared memory and written to the storage devices $208_1$-$208_m$. Generally, any data that has not been accessed recently or within a predetermined period of time may be flushed from the shared memory and written to the storage devices. The CPUs may be used to perform read and write operations.

Some or all of the application data that is used by instances of hosted applications 120 may be generated by transforming raw data into transformed data. Raw data is transformed by a function which changes the raw data in some way. Simple examples of transforming functions may include mathematical operations such logarithmic functions and exponent (power transform) functions including but not limited to square root, cube root, square and cube functions. A very wide variety of mathematical, logical and other functions may be used to transform raw data into transformed data in order to provide application data. The computing and storage nodes may use the GPUs 212 to perform ETL (Extract Transform Load) transactions which produce transformed data from raw data. In one example the nodes transform the raw data to produce transformed data and store both the raw data and the transformed data in the storage devices $208_1$-$208_m$. The CPUs handle storage of raw data. For example, raw data received by the front end controller 202 may be written to the shared memory 204 under the control of one or more CPUs of the front end controller. CPUs of the back end controller 206 may destage the raw data to the storage devices for storage. Before the raw data is destaged, one or more GPUs associated with the front end controller, back end controller or both may access the raw data from the shared memory cache and perform transform calculations to generate transformed data which would be stored in devices $208_1$-$208_m$. Transformed data may be provided as application data concurrent with the performance of the transform operations or from the storage devices. CPUs may be used to retrieve transformed data from the data storage devices.

Figure 3:
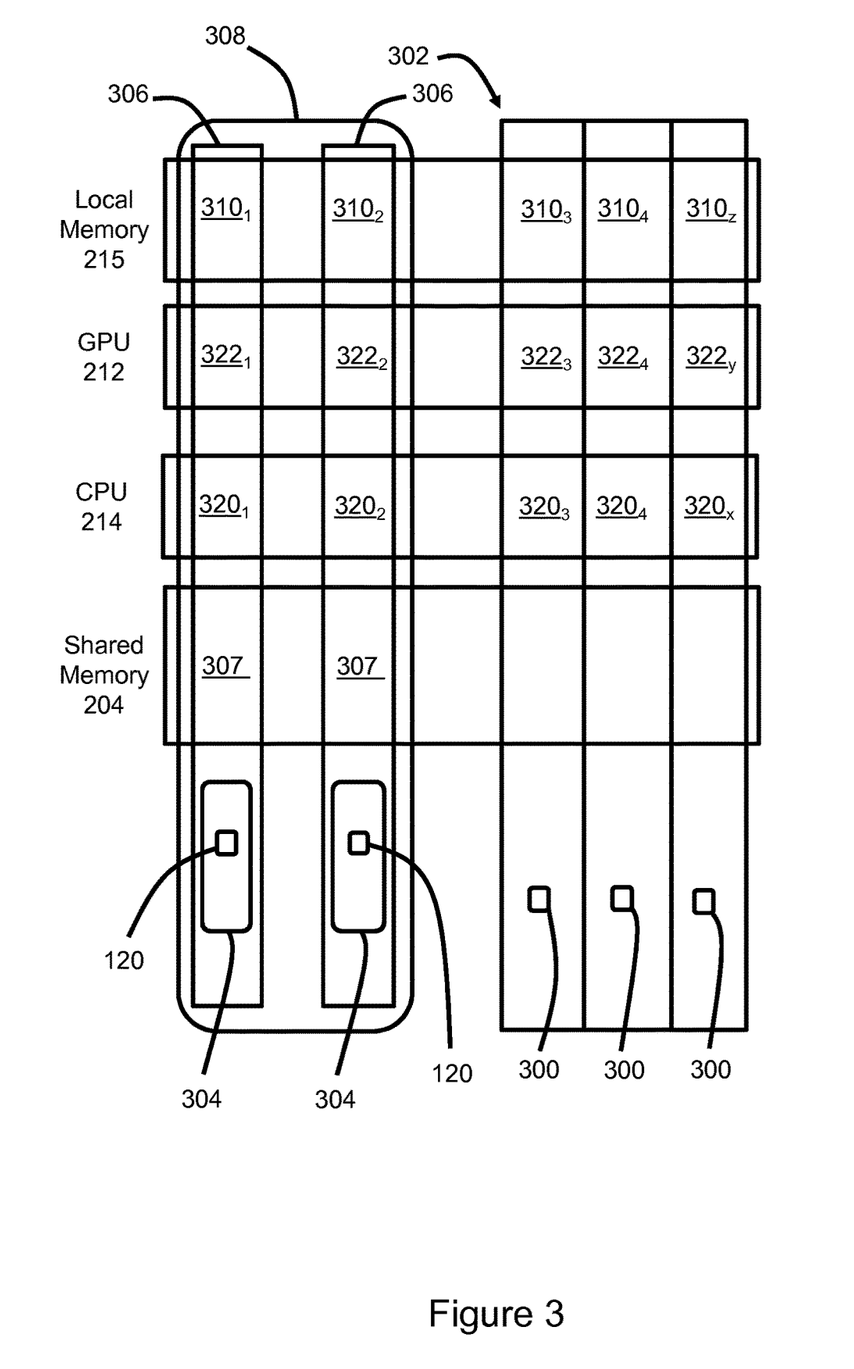
FIG. 3 illustrates sharing of processor and memory resources.

FIG. 3 illustrates sharing of node resources. Each node will run various node threads 300 under the node OS 302. Examples of nodes threads could include but are not limited to programs that support IOs, tiering, RAID, and a wide variety of other functions of the storage system. Each node may also host a plurality of different guest OSs 304 which may host client applications 120. For example and without limitation, multiple instances of the same guest OS and instances of different guest OSs may be hosted. The guest OSs may be different from the node OS, e.g., non-native or native but different. Each guest OS and selected node thread may be allocated a portion of the resources of one or more of the GPU 212, CPU 214, shared memory 204 and local memory 215. The allocated resources for each guest OS may be defined by an associated container 306. For example, the container defines allocated portions 307 of shared memory 204. A computer program such as a hypervisor 308 manages the containers. For example, the hypervisor manages operation of guest OSs which are associated with host applications by sharing the processor resources and memory resources such that, from the perspective of each guest OS, the resources appear to be dedicated to that guest OS.

In order to mitigate contention between guest OSs and threads for the PCI channel the HPP and local memory may be virtualized. For example, multiple virtual HPPS 118 (FIG. 1) may be generated using one or more of the HPPs 210 (FIG. 2). Further, multiple sets of pinned memory pages $310_1$-$310_2$ may be generated using one or more of the local memories 215. Each virtual HPP may include multiple virtual CPUs $320_1$-$320_x$, each of which is based on a unique set of one or more of physical CPU cores, logical CPU cores, or both. Each virtual HPP may also include multiple virtual GPUs $322_1$-$322_y$, each of which is based on a unique set of one or more of physical GPU cores, logical GPU cores, or both. A separate and independent virtual HPP and corresponding set of pinned memory pages may be instantiated for each container 306. Separate and independent virtual HPPs and sets of pinned memory pages may also be instantiated for selected node threads 300.

Figure 4:
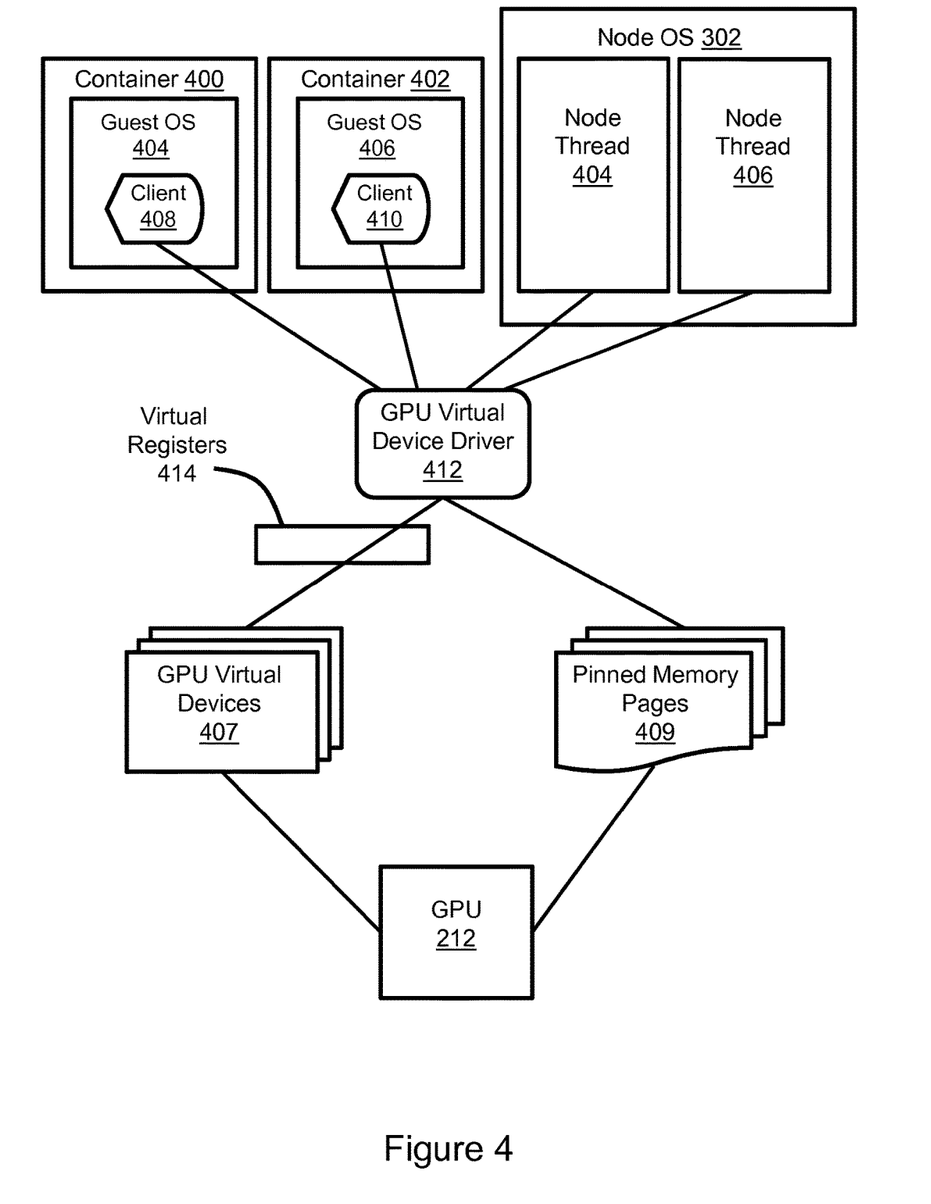
FIG. 4 illustrates GPU virtualization using a virtual device driver.

FIG. 4 illustrates GPU virtualization. GPU virtualization enables a GPU 212 to be contemporaneously shared by multiple containers 400, 402 and multiple node threads 404, 406 by instantiating GPU virtual devices 407 and pinned memory pages 409. For example and without limitation, a separate GPU virtual device and set of pinned memory pages may be allocated for each guest OS and each selected node thread. Each container 400, 402 includes a respective guest OS 404, 406, and each guest OS includes an associated client driver 408, 410. The node threads are run under the node OS 302. Both the node threads and threads running under guest OSs may access the GPU 212 via a GPU virtual device driver 412. The client drivers 408, 410 help to mediate guest OS access to the GPU 212 and enable access the respective GPU virtual device 407 and pinned memory pages 310 allocated to that guest OS. Each GPU virtual device 407 is a software thread which presents a set of the virtual communication protocol registers 414 to other threads. For example and without limitation, the registers 414 could be virtual PCI registers. The virtual PCI registers may be in a buffer that is part of both the pinned memory pages and a portion of the shared memory or local memory. The GPU virtual device driver 412 provides PCI (or other protocol including but not limited to PCIe, PCI-X, AGP, Infiniband, or Ethernet) signaling between the client drivers 408, 410, node threads 404, 406 and the virtual communication protocol registers 414. The pinned memory pages 409 are pages of local memory that are dedicated for use with respective virtual GPU devices. The pinned memory pages provide individual memory buffer spaces shared between the GPU and individual node emulation threads and guest OS containers. Contention for the PCI channel is mitigated by accessing the GPU 212 via GPU virtual device driver 412, virtual PCI registers 414, GPU virtual devices 407 and pinned memory pages 409.

Figure 5:
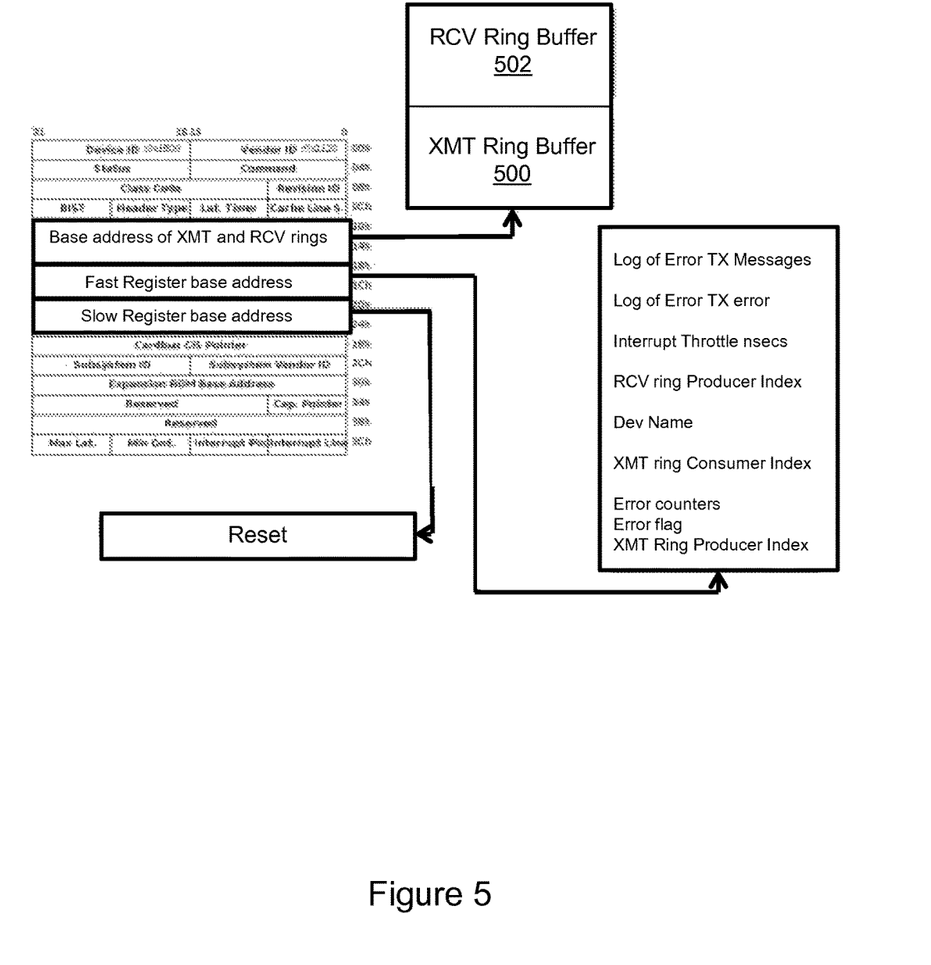
FIG. 5 illustrates a set of virtual PCI registers.

FIG. 5 illustrates an implementation of a set of virtual PCI registers. Each guest OS or node thread may have a separate set of PCI registers. A plurality of sets of virtual PCI registers could be included in the virtual registers 414 (FIG. 4). There are two fast registers associated with a transmit ring buffer 500 of the allocated memory. A transmit ring producer index (TPI) is the index of the next message in the transmit ring that the guest will write. A transmit ring consumer index (TCI) is the index of the next message in the transmit ring that the device will read. If (TPI+1) mod RINGSIZE≠TCI, then the transmit ring is not full. To transmit a message, the guest writes it at index TPI in the transmit ring, then does TPI=(TPI+1) mod RINGSIZE. There are also two fast registers associated with a receive ring 502 of the allocated memory. A receive ring producer index (RPI) is the index of the next message in the receive ring that the device will write. A receive ring consumer index (RCI) is the index of the next message in the receive ring that the CTD Client will read. If RCI≠RPI, then the receive ring is not empty. To receive a message, the CTD Client reads it from index RCI in the receive ring, then does RCI=(RCI+1) mod RINGSIZE.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
at least one storage and computing node comprising:
at least one heterogeneous parallel processor comprising a central processing unit and a graphics processing unit;
a plurality of data storage devices;
a first guest operating system;
a second guest operating system;
first and second sets of pinned memory pages, the first set of pinned memory pages allocated to the first guest operating system and the second set of pinned memory pages allocated to the second guest operating system;
first and second virtual graphics processing units based on the graphics processing unit, the first virtual graphics processing unit allocated to the first guest operating system and the second virtual graphics processing unit allocated to the second guest operating system;
first and second client drivers, the first client driver used by the first guest operating system to access the first virtual graphics processing unit and the second client driver used by the second guest operating system to access the second virtual graphics processing unit; and
a virtual device driver via which the first client driver accesses the first virtual graphics processing unit and the second client driver accesses the second virtual graphics processing unit, wherein the virtual device driver provides communication protocol signaling between the first client driver, the second client driver, storage and computing node threads, and virtual communication protocol registers.

2. The apparatus of claim 1 comprising first and second virtual heterogeneous parallel processors based on the heterogeneous parallel processors, the first virtual graphics processing unit being part of the first virtual heterogeneous parallel processor and the second virtual graphics processing unit being part of the second virtual heterogeneous parallel processor.

3. The apparatus of claim 1 comprising a third virtual graphics processing unit based on the graphics processing unit, the third virtual graphics processing unit allocated to a node thread.

4. The apparatus of claim 1 wherein the virtual device driver comprises a software thread which presents a set of virtual communication protocol registers.

5. The apparatus of claim 4 wherein the virtual communication protocol registers comprise virtual peripheral component interconnect registers.

6. The apparatus of claim 1 wherein the first virtual graphics processing unit comprises specific cores or virtual cores of the graphics processing unit.

7. A method comprising:
in at least one storage and computing node comprising at least one heterogeneous parallel processor comprising a central processing unit and a graphics processing unit, a plurality of data storage devices, a first guest operating system, and a second guest operating system:
instantiating first and second virtual graphics processing units based on the graphics processing unit;
allocating the first virtual graphics processing unit to the first guest operating system;

allocating the second virtual graphics processing unit to the second guest operating system;

creating first and second sets of pinned memory pages, allocating the first set of pinned memory pages to the first guest operating system and allocating the second set of pinned memory pages to the second guest operating system;

instantiating first and second client drivers, the first client driver used by the first guest operating system to access the first virtual graphics processing unit and the second client driver used by the second guest operating system to access the second virtual graphics processing unit;

the first client driver accessing the first virtual graphics processing unit via a virtual device driver and the second client driver accessing the second virtual graphics processing unit via the virtual device driver, the virtual device driver providing communication protocol signaling between the first client driver, the second client driver, storage and computing node threads, and virtual communication protocol registers.

8. The method of claim 7 comprising instantiating first and second virtual heterogeneous parallel processors based on the heterogeneous parallel processors, the first virtual graphics processing unit being part of the first virtual heterogeneous parallel processor and the second virtual graphics processing unit being part of the second virtual heterogeneous parallel processor.

9. The method of claim 7 comprising instantiating a third virtual graphics processing unit based on the graphics processing unit, and allocating the third virtual graphics processing unit to a node thread.

10. The method of claim 7 comprising the virtual device driver presenting a set of virtual communication protocol registers.

11. The method of claim 10 wherein the virtual communication protocol registers comprise virtual peripheral component interconnect registers.

12. The method of claim 7 comprising allocating specific cores or virtual cores of the graphics processing unit to the first virtual graphics processing unit.

* * * * *